United States Patent [19]

Sone et al.

[11] 4,135,873
[45] Jan. 23, 1979

[54] APPARATUS FOR CONTROLLING INJECTION MOLDING MACHINES

[75] Inventors: Tadatoshi Sone; Kiyokazu Kayanuma, both of Numazu, Japan

[73] Assignee: Toshiba Kikai Kabushiki Kaisha, Tokyo, Japan

[21] Appl. No.: 825,137

[22] Filed: Aug. 16, 1977

Related U.S. Application Data

[63] Continuation-in-part of Ser. No. 602,005, Aug. 5, 1975, abandoned, which is a continuation-in-part of Ser. No. 362,501, May 21, 1973, abandoned.

[51] Int. Cl.² .............................................. B29F 1/06
[52] U.S. Cl. .................................. 425/147; 264/40.5; 425/145; 425/149
[58] Field of Search ............... 425/145, 146, 147, 149, 425/135; 264/40, 328, 329, 40.5

[56] References Cited

U.S. PATENT DOCUMENTS

| 2,433,132 | 12/1947 | Lester | 425/149 X |
| 3,667,884 | 6/1972 | Reinfeld | 425/149 |
| 3,773,451 | 11/1973 | Bielfeldt | 425/147 |
| 3,893,792 | 7/1975 | Laczko | 264/40.5 X |
| 3,976,415 | 8/1976 | Hauser et al. | 425/145 |
| 4,060,362 | 11/1977 | Wilson | 425/145 |

Primary Examiner—William R. Briggs

[57] ABSTRACT

In an injection machine of the type wherein plastic material is injected into a pair of separable mold halves by means of an injection plunger actuated by pressurized fluid, a comparator is provided to compare a signal representing the actual spacing between the mold halves and a reference signal corresponding to a predetermined permissible value of the spacing at a predetermined position of the injection plunger. The output of the comparator is used to change the pattern of the force of the pressurized fluid acting upon the injection plunger during the next molding cycles.

2 Claims, 6 Drawing Figures

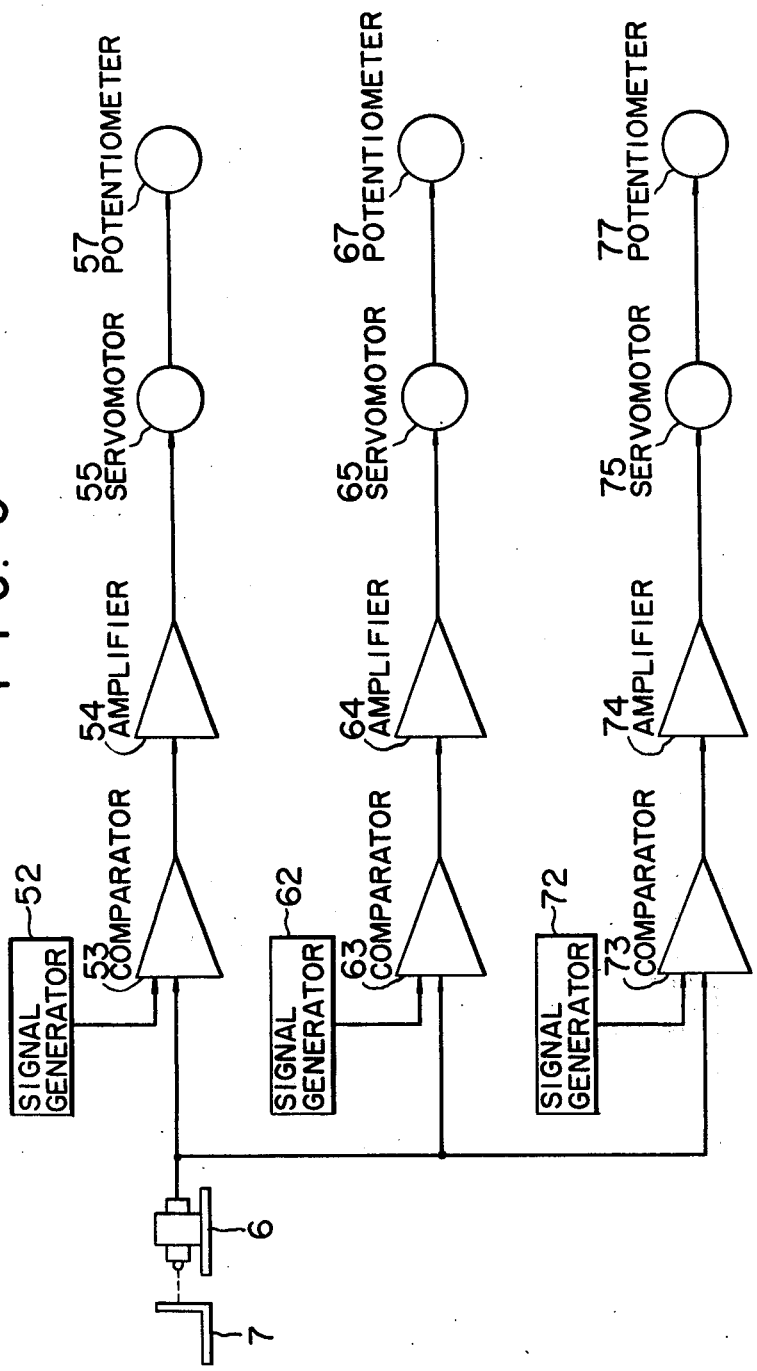

APPARATUS FOR CONTROLLING INJECTION MOLDING MACHINES

This application is a continuation-in-part of Ser. No. 602,005 filed Aug. 5, 1975, now abandoned, which in turn is a continuation-in-part of Ser. No. 362,501 filed May 21, 1973, now abandoned.

BACKGROUND OF THE INVENTION

This invention relates to a method for controlling an injection molding machine, and more particularly to a method for maintaining the spacing between parting planes of metal mold halves of an injection molding machine at a predetermined value.

In this type of the injection molding machine although the metal mold halves are held closed during molding by a clamping force they tend to separate when the injection pressure exceeds the clamping force, and when the mold is deformed due to nonuniform injection of the resin into the mold. Separation of the mold halves results in the variation of the quantity of the resin injected into the mold so that it is desirable to limit the spacing between the mold halves within a permissible range.

The magnitude of the spacing between parting planes of metal mold halves (for brevity, hereinafter merely called "the spacing between mold halves") of an injection molding machine during its injection stroke varies dependent upon the quantity of the resin to be injected into the metal mold, the injection speed and the injection pressure.

Referring now to FIG. 1, it is now assumed that an injection stroke S is divided into four sections A, B, C and D and that the movement of an injection plunger including a screw 8 is controlled such that it is moved at different speeds $v_1$, $v_2$, $v_3$ and $v_4$ in sections A, B, C and D, respectively, while the plunger is moved over the injection stroke S. The spacing $\Delta l$ between the mold halves during this operation varies dependent upon the quantity of the resin to be injected, that is the length of the injection stroke S determined by an injection stroke position detector to be described later, the lengths of respective sections A, B, C and D, or the injection speeds $v_1$, $v_2$, $v_3$ and $v_4$ in respective sections A, B, C and D. As the magnitudes of injection speeds $v_1$–$v_4$ cause variations in the cooling and solidifying conditions of the resin filled in the metal mold, the apparent viscosity of the resin in the metal mold is varied thereby varying the dynamic pressure applied to the inner surface of the metal mold by the resin. This also causes variation in the spacing between the mold halves. Let us denote by $K_1$ the upper limit of a permissible range of the spacing between mold halves which is necessary to produce satisfactory products and by $K_2$ the lower limit of the range. Satisfactory products can be obtained where a condition $K_1 \geqq \Delta l \geqq K_2$ is satisfied. Where $K_1 < \Delta l$, the molded product will be overpacked whereby flashings are formed on the molded product whereas when $K_2 > \Delta l \geqq 0$ the products will have sink marks, or improper dimensions. Even when such sink marks or improper dimensions do not result, the physical properties of the products will be inferior to those of the satisfactory products molded under normal conditions. For example, the weight of the products increases as the spacing increases.

In order to prevent the formation of such rejects, according to an established practice, skilled operators set the operating condition in accordance with the type of the resin, and the configuration of the molded product by relying upon their experience or feeling, and after a number of trial operations they commence regular or normal operations. Further, during the normal operation, should rejects be formed, the operator sets a new operating condition again by relying upon his experience and feeling and repeats a number of trial operations before he can find out the best operating condition. Such method of operation requires much time and labor and waste of raw material during trial operations, and hence is inefficient.

SUMMARY OF THE INVENTION

Accordingly, it is an object of this invention to provide an improved method for controlling an injection molding machine capable of automatically maintaining the spacing between mold halves at a predetermined value without relying upon the feeling or experience of the operator, thus producing satisfactory products.

Another object of this invention is to provide a new and improved method for controlling an injection molding machine capable of establishing a desired operating condition without the necessity of repeating a number of trial operations, thereby saving labor and material.

According to this invention there is provided a method of controlling an injection molding machine of the type wherein resin is injected into a mold including a pair of separable mold halves by means of an injection plunger actuated by fluid pressure, said mold halves being normally held closed by a predetermined clamping force, said method comprising the steps of detecting the actual spacing between the mold halves during a molding cycle which occurs as a result of injection of the resin into the mold, comparing the detected spacing with a permissible value of the spacing and varying the injection pattern of the plunger during the next molding cycle by varying at least one of the parameters from among the injection stroke, injection speed and injection pressure of the plunger when the detected spacing is not equal to the permissible value.

The apparatus for carrying out the method of this invention comprises means for detecting the actual spacing between the mold halves which occurs as a result of injection of the resin thereinto, comparator means for comparing the output from the detecting means with a predetermined permissible value of the spacing, and means responsive to the output from the comparator means for varying the injection pattern of the plunger.

In this manner, even when the type of the resin or the dimension or configuration of the product is varied, the actual spacing between the mold halves is automatically set to be less than a predetermined permissible value which is necessary to avoid formation of rejects. Consequently, the required injection pattern is automatically set without performing a number of trial runs or relying upon the feeling or experience of the operator.

BRIEF DESCRIPTION OF THE DRAWINGS

In the accompanying drawings:

FIGS. 4 and 5 are simplified electric circuits showing the flow of control signals.

DESCRIPTION OF THE PREFERRED EMBODIMENTS

Figure 1:
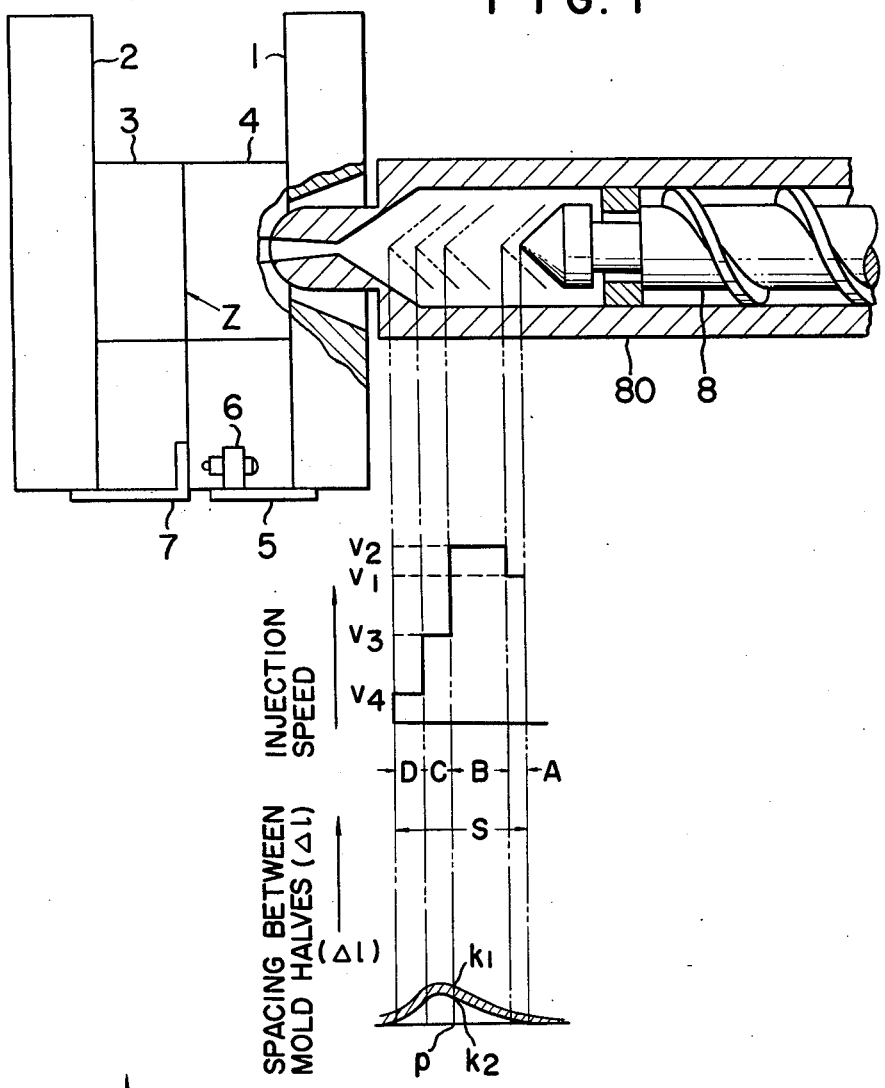
FIG. 1 shows a side view, partly in longitudinal section, of an injection molding machine for carrying out the method according to the invention together with graphs showing the relationship between the injection speed, or the spacing between mold halves, and the injection stroke.

FIG. 1 of the accompanying drawings shows one embodiment of this invention in which the injection stroke S is divided into four arbitrarily determined sections A, B, C and D, the resin is injected at injection speeds $v_1$, $v_2$, $v_3$ and $v_4$ in respective sections and the actual spacing $\Delta l$ between mold halves 3 and 4 is detected by a differential transformer 6.

Figure 2:
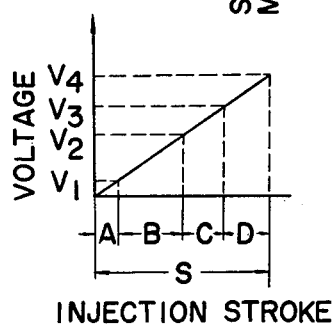
FIG. 2 is a graph showing the relationship between the movement of the injection plunger over the injection stroke and the voltage generated by a potentiometer.
Figure 3:
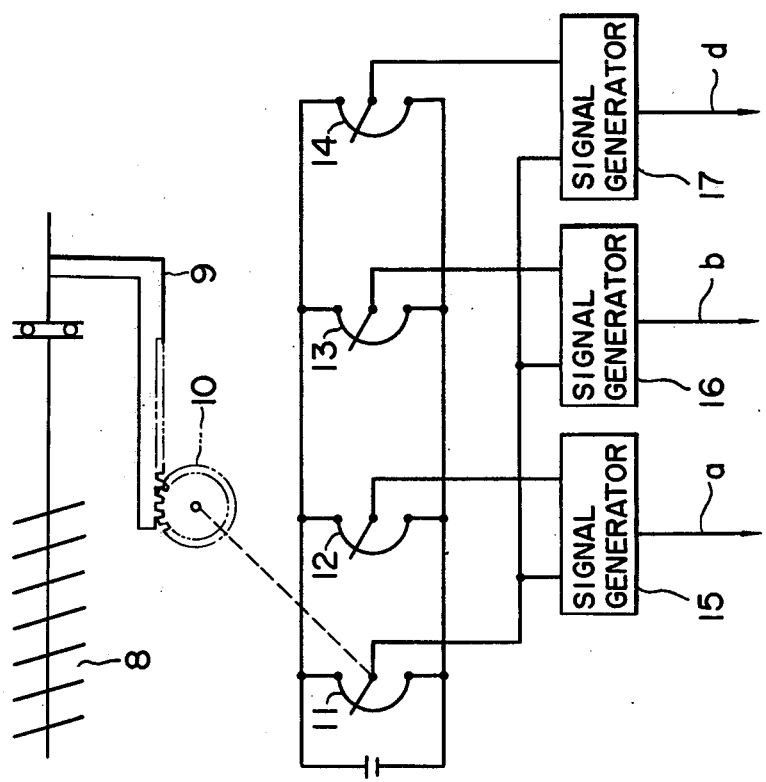
FIG. 3 is a block diagram showing the connection of electrical signal generators which are used to generate signals necessary for switching the injection speeds during the injection stroke.

The injection molding machine shown in FIGS. 1 to 3 comprises a stationary plate 1 carrying the mold half 4 and a movable plate 2 carrying the other mold half 3 which is forced against the mold half 4 at a parting plane Z by a predetermined clamping force or pressure when these two mold halves are closed. In an ordinary injection molding machine, utilizing an injection pressure of 800 to 1600 kg/cm$^2$, for example, the clamping force of the mold halves is selected such that the mean resin pressure in the mold would be 250 to 450 kg/cm$^2$. Accordingly, when the molten or plastic resin is filled in the mold cavity, the mold halves will be separated slightly by the pressure of the resin and the deformation of the mold and close again. Although the extent of the separation varies depending upon the type of the resin and the construction of the metal mold, the maximum spacing generally amounts to 3 to 4 mils at the maximum. The differential transformer 6 is mounted on a bracket 5 secured to stationary plate 1. A letter L shaped magnetic plate 7 is mounted on the movable plate 2 to cooperate with the differential transformer 6 for detecting the spacing $\Delta l$ between the mold halves. A cylindrical injection head 80 is associated with the stationary plate 1 and a rack 9 is connected to an injection plunger including a screw 8 to move therewith as diagrammatically shown in FIG. 3 for rotating a pinion 10 meshing with rack 9 thereby transforming the linear motion of the plunger into the rotary motion of pinion 10.

Although not shown in the drawing, the injection plunger is reciprocated in the head 80 over stroke S by means of a fluid pressure actuator as in the usual manner. A potentiometer 11 acting as an injection stroke position detector for detecting the retracted position of the screw 8, that is the length of the injection stroke S, is connected directly or through a gear train (not shown) to pinion 10 for producing a voltage proportional to the distance over which the injection plunger moves. The lengths of the divided sections A, B, C and D of the stroke S are detected in terms of the variation in the voltage for switching the injection speed among $v_1$, $v_2$, $v_3$ and $v_4$.

More particularly, while the injection plunger is moved over the injection stroke S, the voltage generated by the potentiometer 11 varies from 0 to $v_4$ as shown in FIG. 2. For the purpose of switching among sections A, B, C and D, potentiometers 12, 13 and 14 are provided. Potentiometer 12 is set to produce a signal for switching from section A to section B. Potentiometer 13 is set to produce a signal for switching from section B to C, whereas potentiometer 14 is set to produce a signal for switching from section C to section D. When the injection plunger reaches the end of section A potentiometer 11 generates voltage $V_1$ and when the plunger is moved through sections A and B, and through sections A, B and C respectively, the potentiometer 11 generates voltages $V_2$ and $V_3$ respectively. Then, as shown in FIG. 3, while the plunger is moved over the injection stroke S, signal generators 15, 16 and 17 associated with the potentiometers 12, 13 and 14, respectively generate control signals a, b and d respectively as a result of comparison of the voltages $V_1$, $V_2$ and $V_3$ generated by potentiometer 11 with signals generated by potentiometers 12, 13 and 14, respectively. Signals, a, b and d are used to operate a flow regulator valve or a pressure regulator valve of a source of fluid pressure for actuating the injection plunger, thereby switching the injection speeds $v_1$, $v_2$, $v_3$ and $v_4$ in sections A, B, C and D, respectively, as will be described later in more detail.

Figure 4:
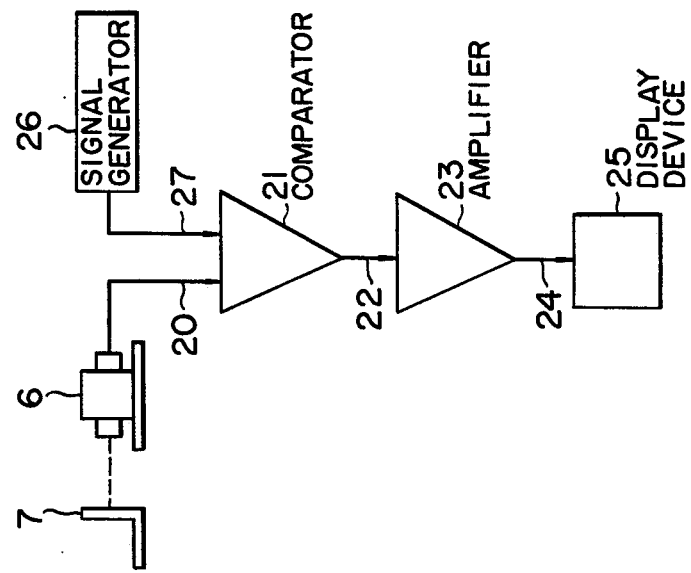

The control circuit utilized in this invention will now be described with reference to FIG. 4. The differential transformer 6 cooperates with plate 7 for producing an electrical signal 20 corresponding to the actual spacing between two mold halves 3 and 4, the signal 20 being applied to a comparator 21. Taking a point P (see FIG. 1) at an intermediate point equal to a length A+B in the injection stroke S as a check point, the comparator 21 operates to compare signal 20 with an electric signal 27 generated by a signal generator 26 and representing an allowable spacing between the mold halves $K_1 \geq \Delta l \geq K_2$ for satisfactory products so as to determine whether it is necessary to correct the injection pattern or not during the next molding cycle. Although it is advantageous to correct the injection pattern at once whenever the actual spacing between the mold halves becomes different from the allowable spacing described above, it is impossible to do so because of the high injection speed. For this reason, according to this invention the control is effected in such a way that actual correction is made during the next molding cycle. More particularly, where such correction is necessary, comparator 21 generates a signal 22 which is applied to a variable amplifier 23. As the signal 22 corresponds to the value of the difference between the actual spacing $\Delta l$ between the mold halves and the desired spacing, after being amplified by variable amplifier 23 it is converted into an electric signal 24 corresponding to the variation in the injection speed at the checkpoint P or to the variation in the length of the distance A+B and the converted signal 24 is sent to a display device 25 which is constructed to provide a digital or analogue display of the corrected value of the injection speed at the check point P or of the distance A+B.

In this manner, where it is desired to correct the positions of the injection speed switching points at the ends of A+B and A+B+C in accordance with the result displayed by display device 25, it is possible to vary the lengths of sections B and C by varying the settings of voltages $V_2$ and $V_3$ of potentiometers 13 and 14 (FIG. 3) which are used for switching from section B to section C and from section C to section D, respectively. On the other hand, where it is desired to vary the injection speed, for example $v_3$ in section C, the setting of the flow quantity regulator valve or the pressure regulator valve (not shown) utilized to actuate the injection plunger is varied thereby varying the injection speed $v_3$. The other injection speeds can also be varied in the same manner.

More particularly, where the check point P is selected to be at the end of section B as shown in FIG. 1 for checking the spacing between the mold halves, and when the length of sections A+B is varied immediately, the injection pattern is actually varied in the next and following molding cycles.

Although in the foregoing description, only one check point has been used, it should be understood that a plurality of check points can also be used, and that instead of applying the signal 24 to display device 25, the signal 24 may be applied to servomotors which are interlocked with the potentiometers utilized to effect switchings between respective sections thereby automatically varying the settings of the voltages of such potentiometers.

FIG. 5 diagrammatically shows such a modified embodiment. In this embodiment, the electric signal produced by the differential transformer 6 and representing the spacing between mold halves is applied to respective comparaters 53, 63 and 73 together with signals from signal generators 52, 62 and 72 which respectively generate signals representing the allowable spacings between mold halves at respective check points. The signals generated by generators 52, 62 and 72 are applied to comparators 53, 63 and 73 through gate circuits 70a, 70b and 70c which are controlled by the control signals a, b and d generated by generators 15, 16 and 17, respectively, shown in FIG. 3. Instead of providing the gate circuits on the output side of the signal generators 52, 62 and 72 it is also possible to install suitable gate circuits on the input sides of the signal generators so as to control the signal generating operation thereof. The outputs from comparators 53, 63 and 73 are applied to servo-motors 55, 65 and 75, respectively via variable amplifiers 54, 64 and 75. Servo-motors 55, 65 and 75 are interlocked with potentiometers 57, 67 and 77, respectively, to vary their voltage settings so as to vary the lengths of sections A, B, C and D during the injection stroke S or the injection speeds $v_1$, $v_2$, $v_3$ and $v_4$ in respective sections during the next molding cycle thus varying the injection pattern. It will be clear that the potentiometers 57, 67 and 77 may be replaced by electromagnetically operated flow quantity regulator valves or pressure regulator valves which control the injection speeds. Furthermore, it will be clear that the outputs of the three comparators 53, 63 and 73 can be applied to a common servo-motor since control signals a, b and d are generated sequentially.

It will be clear that instead of using rotary potentiometers it is also possible to use linear type potentiometers and that a pneumatic micrometer, a magnetic sensor or the like gap measuring device can be used to detect the spacing between mold halves.

As an example, cup shaped products were manufactured by injecting an ABS (acrylic - butadiene - styrene) resin at a primary injection pressure of 100 kg/cm² and a secondary injection pressure of 42 kg/cm². The injection speed was varied as follows. From 90 mm (measured from the end of the stroke) to 25 mm, 84 mm/sec; from 25 mm to a SF point (stroke of feeding), 51 mm/sec; and from the SF point to the end of the stroke, 4 mm/sec. The SF point was varied and it was found that the SF point and the spacing between the mold halves are related as shown in the following table.

TABLE

| SF (mm) | Spacing (mm) |
|---------|--------------|
| 12.2    | 0.02         |
| 11.4    | 0.03         |
| 10.5    | 0.05         |

It was found that a value of SF = 11.4 mm gives satisfactory molded products.

Figure 6:
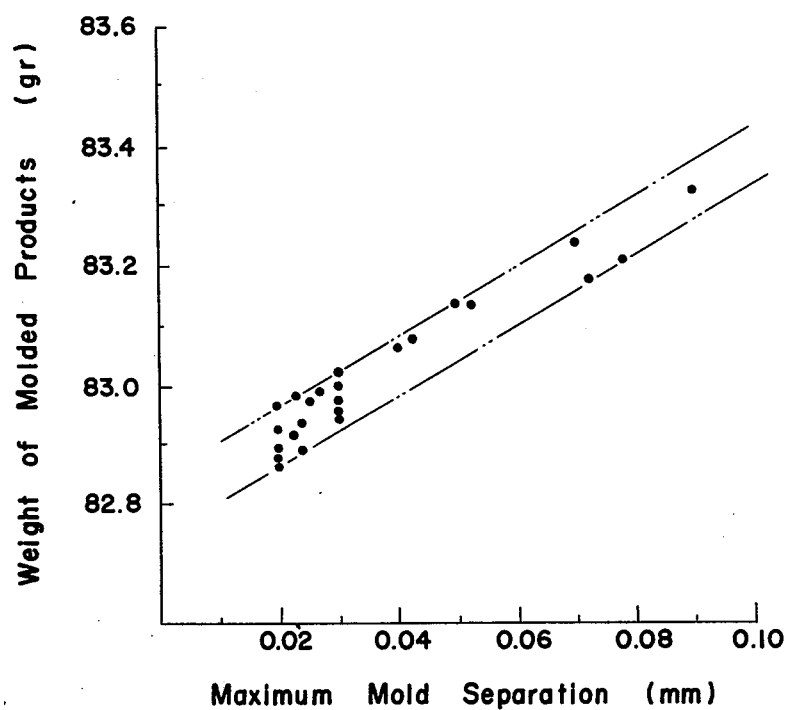
FIG. 6 is a plot showing the relationship between the maximum mold separation and the weight of the molded products.

As shown in this table and in FIG. 6, the spacing of the mold halves and the weight of the products have a close relation. Thus, when the maximum mold separation is in the range of from about 0.02 mm to about 0.03 mm, the variation in the weight of the molded product is minimum. The result of our experiment shows that, under an adequate molding condition, a maximum mold separation in a range of from 0.002 to 0.008 mm gives satisfactory products. With the maximum spacing in this range, the resin will not leak through the parting surfaces even when resins having low viscosity are molded such as polyamide resin or polyethylene.

We claim:

1. In an injection molding machine of the type wherein plastic material is injected into a mold including a pair of separable mold halves by means of an injection plunger having the stroke divided into a plurality of sections and actuated by pressurized fluid, and having pressurized fluid force varying means for varying the force of said pressurized fluid action on said injection plunger in each section in accordance with the position of said injection plunger, an apparatus for controlling said injection molding machine comprising detecting means having means cooperating with said mold halves for detecting means having means cooperating with said mold halves for detecting the actual spacing between said mold halves which occurs as a result of injection of the plastic material thereinto, a voltage generating means operatively connected to said injection plunger for generating a voltage proportional to the stroke of said injection plunger while it is operated successively through said sections, switching signal generating means for generating signals for effecting switching from one of said sections to the other, a plurality of signal generators respectively connected to said voltage generating means and corresponding ones of said switching signal generating means for responding to the voltage produced by said voltage generating means and to the signals generating control signals at the end of generating means for generating control signals at the end of the respective sections of said stroke of said injection plunger, a plurality of further signal generators for respectively generating reference signals representing predetermined permissible values of said spacing between said mold halves at respective check points in the respective sections of said stroke, a plurality of comparators connected to receive the output of said detecting means, gate means connected between said further signal generators and said comparators and connected to said firstmentioned signal generators and respectively controlled by said control signals for applying the outputs of said further signal generators to respective comparators, whereby said comparators compare the output from said detecting means with signals respectively generated by said further signal generators, and servo-motor means responsive to the outputs of said comparators for controlling said pressurized fluid force varying means for varying the force of said pressurized fluid acting on said injection plunger in the respective sections.

2. In an injection molding machine of the type wherein plastic material is injected into a mold including a pair of separable mold halves by means of an injection plunger having the stroke divided into a plurality of sections and actuated by pressurized fluid, and having pressurized fluid force varying means for varying the force of said pressurized fluid acting on said injection plunger in each section in accordance with the position of said injection plunger, an apparatus for controlling said injection molding machine comprising detecting means having means cooperating with said mold halves for detecting the actual spacing between said mold halves which occurs as a result of injection of the plastic material thereinto, a first potentiometer being operatively connected to said injection plunger for generating a voltage proportional to the stroke of said injection plunger while it is operated successively through said sections, a plurality of further potentiometers respectively being set for generating signals for effecting switching from one of said sections to the other, a plurality of signal generators respectively connected to said first potentiometer and corresponding ones of said further potentiometers for responding to the voltage produced by said first potentiometer and to the signals generated by said further potentiometers for generating control signals at the end of the respective sections of said stroke of said injection plunger, a plurality of further signal generators for respectively generating reference signals representing predetermined permissible values of said spacing between said mold halves at respective check points in the respective sections of said stroke, a plurality of comparators connected to receive the output of said detecting means, gate means connected between said further signal generators and said comparators and connected to said firstmentioned signal generators and respectively controlled by said control signals for applying the outputs of said further signal generators to respective comparators, whereby said comparators compare the output from said detecting means with signals respectively generated by said further signal generators, and servo-motor means responsive to the outputs of said comparators for controlling said pressurized fluid force varying means for varying the force of said pressurized fluid acting on said injection plunger in the respective sections.

* * * * *